United States Patent
Moon et al.

(10) Patent No.: US 9,841,963 B2
(45) Date of Patent: Dec. 12, 2017

(54) METHOD AND APPARATUS FOR MANAGING APPLICATION

(71) Applicant: Samsung Electronics Co., Ltd., Suwon-si, Gyeonggi-do (KR)

(72) Inventors: Bo-seok Moon, Gunpo-si (KR); Sun-min Park, Seoul (KR); Sang-ho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/620,558

(22) Filed: Feb. 12, 2015

(65) Prior Publication Data
US 2015/0261548 A1 Sep. 17, 2015

(30) Foreign Application Priority Data
Mar. 17, 2014 (KR) .................. 10-2014-0031157

(51) Int. Cl.
*G06F 9/445* (2006.01)
*G06F 11/34* (2006.01)

(52) U.S. Cl.
CPC .............. *G06F 8/62* (2013.01); *G06F 11/34* (2013.01); *Y02B 60/183* (2013.01)

(58) Field of Classification Search
CPC ...................................................... G06F 8/62
USPC ........................................................ 717/168
See application file for complete search history.

(56) References Cited

U.S. PATENT DOCUMENTS

| 8,666,452 | B2 * | 3/2014 | Choi | H04M 1/72566 |
| | | | | 455/418 |
| 9,075,652 | B2 * | 7/2015 | Stemen | G06F 9/4893 |
| 2010/0010644 | A1 * | 1/2010 | Sip | 700/28 |
| 2014/0215366 | A1 * | 7/2014 | Ryu et al. | 715/765 |
| 2014/0245286 | A1 * | 8/2014 | Wong et al. | 717/174 |

FOREIGN PATENT DOCUMENTS

KR    10-2012-0114125 A    10/2012

OTHER PUBLICATIONS

Joshua Johnson; "Tame Those Background Processes with App Tamer"; App Storm website (mac.appstorm.net); Sep. 10, 2011.*
Rob Griffiths; "Some Background on Background Processes"; Macworld.com website; Jun. 10, 2008.*

* cited by examiner

*Primary Examiner* — Anil Khatri
*Assistant Examiner* — Clint Thatcher
(74) *Attorney, Agent, or Firm* — Jefferson IP Law, LLP

(57) ABSTRACT

A method of managing an application having a background module is provided. The method includes operations of determining a first background stop time and stopping the execution of the background module of the application during the first background stop time, wherein the first background stop time is a time period between a point of time when execution of the application was stopped and a first point of time.

19 Claims, 13 Drawing Sheets

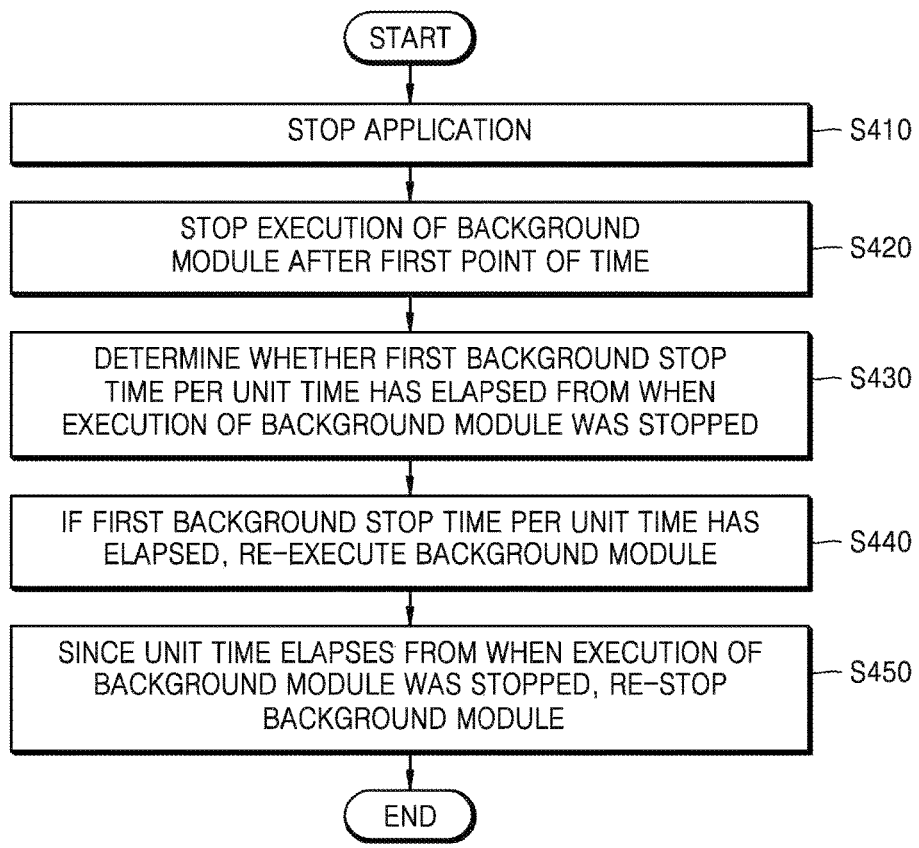

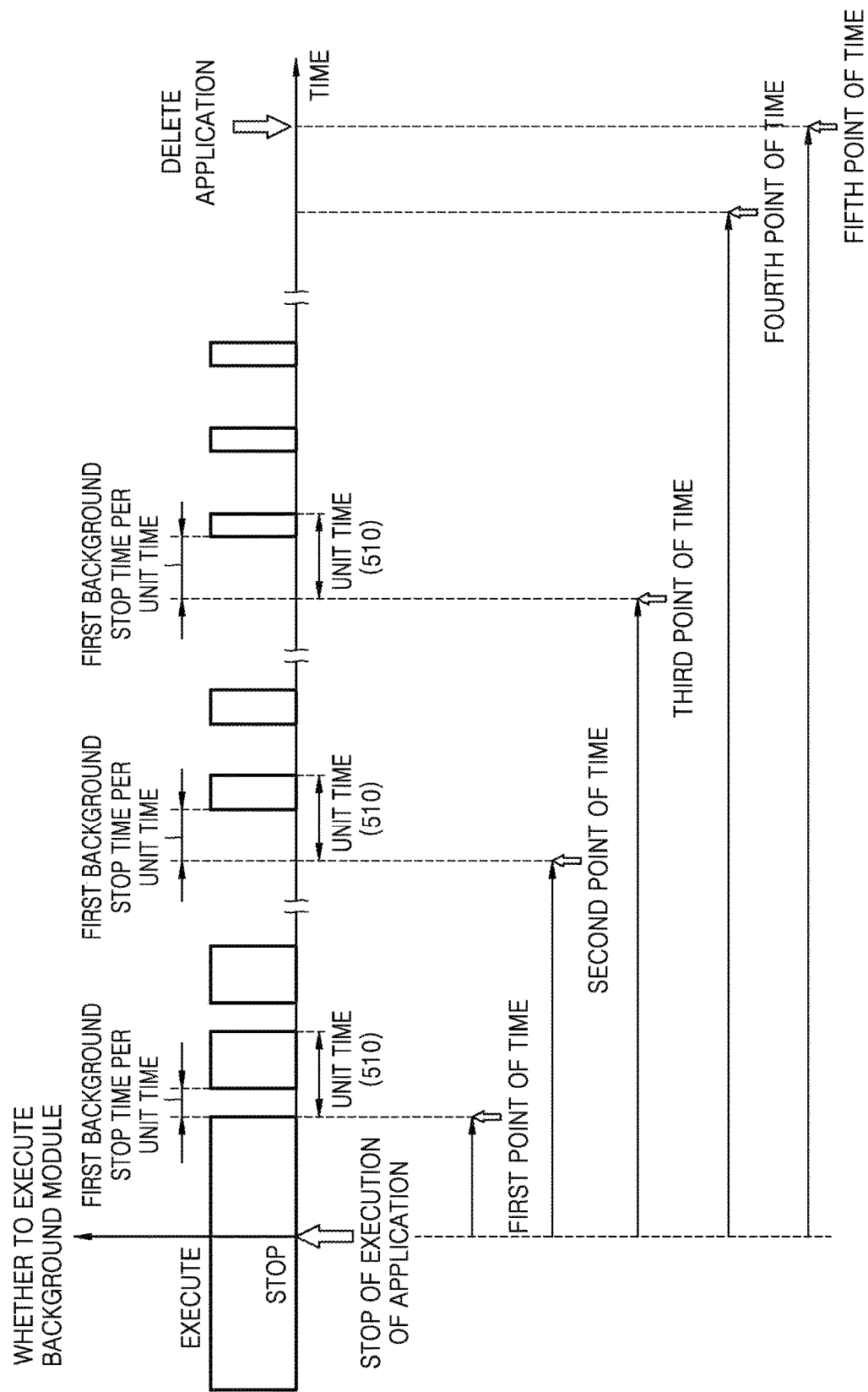

FIG. 6

| APPLICATION | EXECUTION TIME PER WEEK | NUMBER OF TIMES OF EXECUTION PER WEEK | CHECK POINTS OF TIME AFTER END OF APPLICATION | | | | EXPECTED DELETION TIME OF APPLICATION |
|---|---|---|---|---|---|---|---|
| | | | FIRST POINT OF TIME | SECOND POINT OF TIME | THIRD POINT OF TIME | FOURTH POINT OF TIME | FIFTH POINT OF TIME |
| APPLICATION 1 | 10 | 50 | 2 WEEKS | 4 WEEKS | 6 WEEKS | 8 WEEKS | 9 WEEKS |
| APPLICATION 2 | 2 | 10 | 1 WEEKS | 3 WEEKS | 5 WEEKS | 6 WEEKS | 7 WEEKS |
| APPLICATION 3 | 1 | 5 | 3 DAYS | 7 DAYS | 2 WEEKS | 4 WEEKS | 5 WEEKS |

FIG. 7

| BACKGROUND MODULE | NETWORK USE | CPU USE RATE | BACKGROUND STOP TIME (PER 1 HOUR) | | |
|---|---|---|---|---|---|
| | | | FIRST BACKGROUND STOP TIME | SECOND BACKGROUND STOP TIME | THIRD BACKGROUND STOP TIME |
| BACKGROUND MODULE OF APPLICATION 1 | 2 Mbps | 3 % / 1 HOUR | 30 | 40 | 50 |
| BACKGROUND MODULE OF APPLICATION 2 | 1 Mbps | 1 % / 1 HOUR | 20 | 30 | 40 |
| BACKGROUND MODULE OF APPLICATION 3 | 0.5 Mbps | 0.5% / 1 HOUR | 10 | 20 | 30 |

710 — 720 — 730

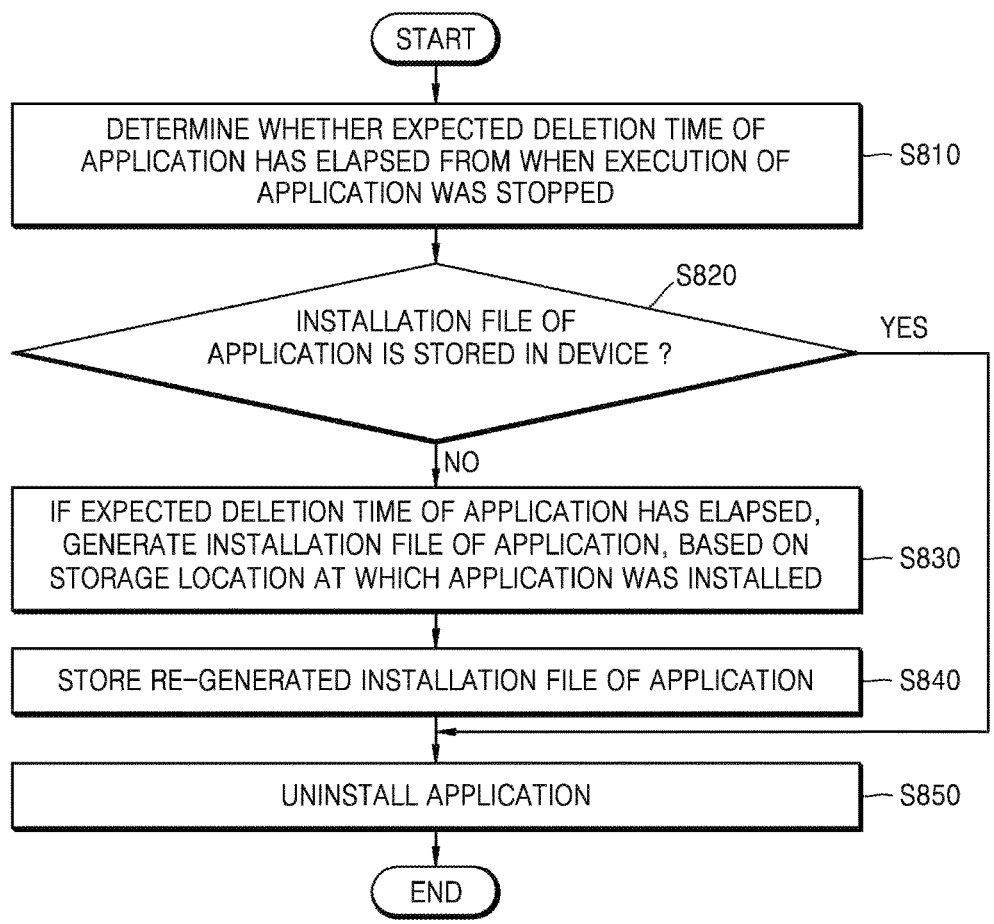

METHOD AND APPARATUS FOR MANAGING APPLICATION

CROSS-REFERENCE TO RELATED APPLICATION(S)

This application claims the benefit under 35 U.S.C. §119(a) of Korean patent application filed on Mar. 17, 2014 in the Korean Intellectual Property Office and assigned Serial number 10-2014-0031157, the entire disclosure of which is hereby incorporated by reference.

TECHNICAL FIELD

The present disclosure relates to a method and apparatus for managing an application.

BACKGROUND

Due to developments in multimedia technology and network technology, various types of devices are used by users.

Also, the number of applications that are executable in a device has sharply increased. Moreover, the number of background modules, which are unrecognizable by a user and necessary for certain applications, have also increased.

Since the number of applications that are executed in a device has increased, power consumption of the applications also increases. In particular, power consumption of applications that are not currently used increases.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for decreasing an execution time of an unnecessary application that is executed in a device.

Additional aspects will be set forth in part in the description which follows and, in part, will be apparent from the description, or may be learned by practice of the various embodiments of the present disclosure.

In accordance with an aspect of the present disclosure, a method of managing an application having a background module, is provided. The method performed by a mobile terminal includes operations of determining a first background stop time and stopping the execution of the background module of the application during the first background stop time, wherein the first background stop time is a time period between a point of time when execution of the application was stopped and a first point of time.

The first background stop time may be determined in proportion to the time period between the point of time when the execution of the application was stopped and the first point of time.

The first background stop time may include a first background stop time per unit time that corresponds to a time period during which the execution of the background module is stopped for a preset interval.

The operation of stopping the execution of the background module may include operations of stopping the execution of the background module after the first point of time, determining whether the first background stop time per unit time has elapsed from when the execution of the background module was stopped, and if the first background stop time per unit time has elapsed, re-executing the background module.

The first background stop time may be determined based on at least one selected from power consumption, resource use, or network use of the background module.

The first point of time may be one of a plurality of points of time that are preset and are determined based on at least one selected from a number of times of execution, an execution interval, or an execution time period of the application.

After a last point of time from the plurality of points of time, from when the execution of the application was stopped, the method may further include an operation of uninstalling the application in the mobile terminal.

The operation of uninstalling the application may include operations of generating an installation file of the application, based on a storage location in which the application is installed, storing the installation file of the application, and uninstalling the application.

The operation of uninstalling the application may further include operations of displaying a user interface for receiving an input for selecting whether to uninstall the application and uninstalling the application, based on a user input selecting to uninstall the application.

The method may further include operations of receiving a user input requesting execution of the application, upon the receiving of the user input, installing the application based on a storage location in which the installation file of the application is stored, and executing the application.

In accordance with another aspect of the present disclosure, a mobile terminal is provided. The mobile terminal includes a processor configured to execute one or more modules and a storage device for storing the one or more modules, wherein the one or more modules comprise an application having a background module and a management application to determine a first background stop time and stop the execution of the background module during the first background stop time, and wherein the first background stop time is a time period between a point of time when execution of the application was stopped and a first point of time.

In accordance with another aspect of the present disclosure, a non-transitory computer-readable recording medium is provided. The computer-readable recording medium includes a recorded program for executing the method by using a computer.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a flowchart of a method of periodically controlling execution of the background module since a time elapses from when execution of the application was stopped according to an embodiment of the present disclosure;

FIG. 5 illustrates an example in which the device periodically controls execution of the background module since a time elapses from when execution of the application was stopped, according to an embodiment of the present disclosure;

FIG. 6 illustrates a method of determining an execution time of the background module based on a use history of the application according to an embodiment of the present disclosure;

FIG. 7 illustrates a method of determining an execution time of the background module based on a characteristic of the background module according to an embodiment of the present disclosure;

FIG. 8 is a flowchart of a method of deleting the application since a time elapses from when execution of the application was stopped according to an embodiment of the present disclosure;

Throughout the drawings, it should be noted that like reference numbers are used to depict the same or similar elements, features, and structures.

DETAILED DESCRIPTION

Figure 1A:
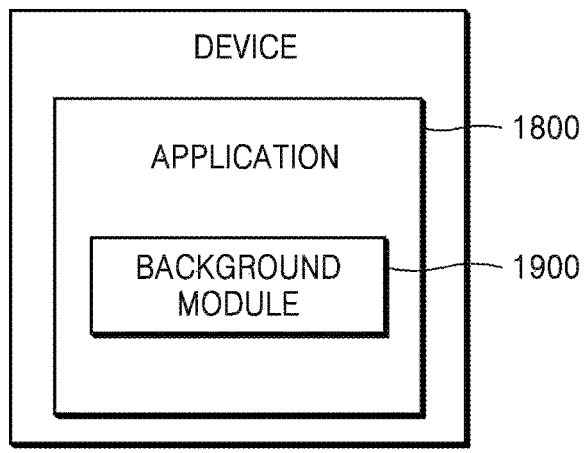
FIGS. 1A and 1B illustrate an example in which a device controls execution of a background module since time elapses from when execution of an application was stopped, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

Reference will now be made in detail to various embodiments, examples of which are illustrated in the accompanying drawings, wherein like reference numerals refer to like elements throughout. In this regard, the various embodiments of the present disclosure may have different forms and should not be construed as being limited to the descriptions set forth herein. Accordingly, the various embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 1B:
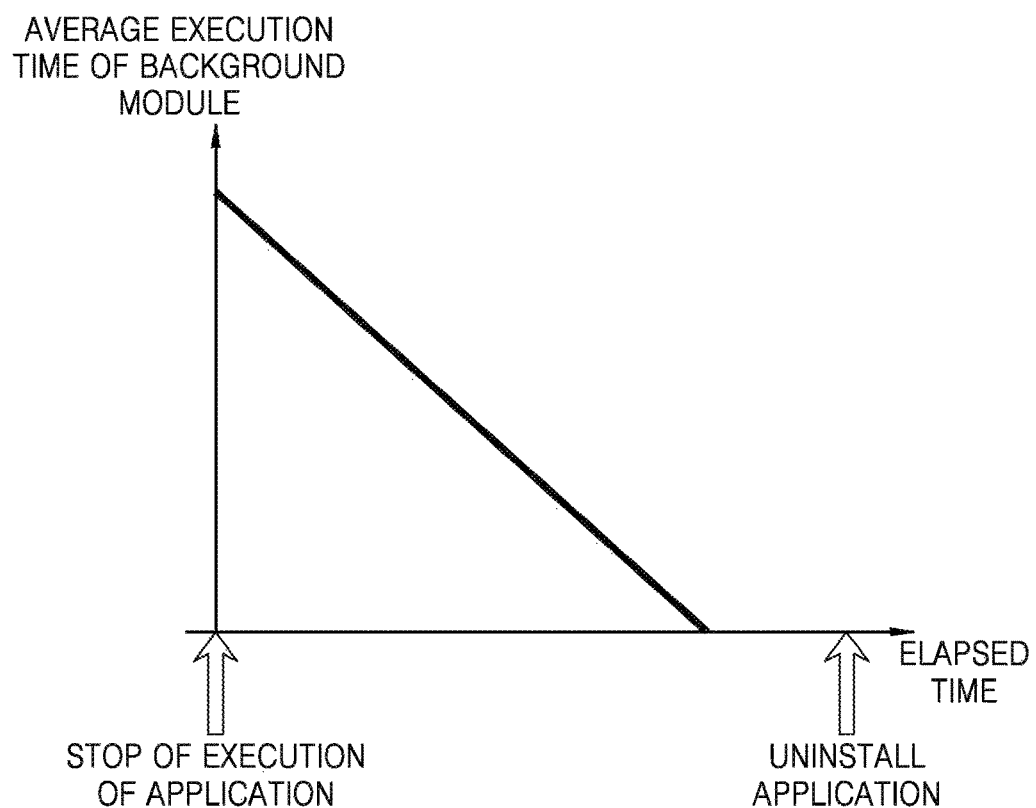

FIGS. 1A and 1B illustrate an example in which a device 1000 controls execution of a background module since time elapses from when execution of an application was stopped, according to an embodiment of the present disclosure.

Referring to FIG. 1A, the device 1000 may execute at least one application 1800. The application may be, for example, related to a social network, position tracking, motion recognition, gaming, and so forth. That is, the application 1800 may be executed by the device 1000 to perform a particular function (hereinafter, the application 1800 may be referred to as 'the social network application 1800', 'the position tracking application 1800', or 'the motion recognition application 1800'). The application 1800 may include application software. In one or more various embodiments, the application 1800 may be referred to as various names such as a software application, a program, a software module, an application program, and an App.

The application 1800 may be configured by one or more modules. Here, each module may mean software that is implemented to perform a particular function of the application 1800. The modules may interact with each other to execute the application 1800. Also, some modules may independently operate so that only some functions of the application 1800 may be performed. One module may be implemented by executing at least one thread.

Also, the application 1800 may include at least one background module 1900. The background module 1900 may be unrecognizable to a user but continuously performs a particular function in the device 1000. For example, the background module 1900 may include, but is not limited to, a module for periodically monitoring specific data via a network, a module for periodically receiving a Rich Site Summary (RSS) feed from an external server via a network and parsing recent Extensible Markup Language (XML) data, a module of the social network application 1800 for periodically exchanging data with a server, a module of the position tracking application 1800 for periodically receiving data from a global positioning system (GPS) satellite, and a module of the motion recognition application 1800 for periodically sensing a motion of the user. In one or more various embodiments, the background module 1900 may be referred to as a service, a background service, a server, and a daemon.

The application 1800 may include at least one foreground module. The foreground module from among modules that configure the application 1800 may indicate a module that directly interacts with a user. For example, the foreground module may include, but is not limited to, a module for receiving a user input, a module for displaying information in response to execution of the application 1800, and a module for outputting sound in response to execution of the application 1800.

The application 1800 may be configured of only the background module 1900 or may include the background module 1900 and the foreground module.

When the execution of the application 1800 is stopped, at least one module may be continuously executed. For example, even when the social network application 1800 is stopped while the social network application 1800 is executed, a module may be continuously executed to exchange data with a server and to store a received message in the device 1000.

Also, even when the application 1800 is not executed, the background module 1900 may be continuously executed from when the application 1800 was installed.

A stop of the execution of the application 1800 may mean that the foreground module from among the modules that configure the application 1800 is not executed.

Also, the stop of the execution of the application 1800 or a stop of the execution of the background module 1900 may include not only an end of the execution but may also include a pause of the execution.

The device 1000 may download an installation file of the application 1800 from an external server or an external device to the device 1000. The device 1000 may store the downloaded installation file of the application 1800 in a predetermined storage location (e.g., /data/app).

The installation file of the application 1800 may indicate a distributed file to make the application 1800 installed in the device 1000. The installation file of the application 1800 may include an execution file of the application 1800 and a resource file for the execution file of the application 1800. Also, the installation file of the application 1800 may further include an information file such as a title or a version of the application 1800, an execution authority of the application 1800 with respect to resources of the device 1000, and an authentication file about the execution of the application 1800.

A format of the installation file of the application 1800 may be a compressed file format (e.g., zip, apk or jar). Also, in one or more various embodiments, the installation file of the application 1800 may be referred to as a package file of the application 1800.

The device 1000 may install the application 1800, based on the installation file of the application 1800.

For example, the device 1000 may generate a logical storage in which the application 1800 is to be installed. The device 1000 may generate a directory (e.g., /data/cache/) for storing the installation file and a directory (e.g., /data/data/<package file name>/) for storing necessary data for the execution of the application 1800. The necessary data for the execution of the application 1800 may include resource data, a database of the application 1800, or data that is generated in response to the execution of the application 1800.

Afterward, the device 1000 may decompress the compressed installation file of the application 1800 and may extract the installation file and a resource file of the application 1800.

Then, the device 1000 may generate identification (ID) information (e.g., an application ID) of the application 1800 that corresponds to the installed application 1800 and may store the generated ID information. Also, in order to correspond to the ID information of the application 1800, the device 1000 may store storage locations in the form of a file or a database, wherein the storage locations are about a storage location at which the installation file of the application 1800 was stored and a storage location at which the application 1800 was installed. Accordingly, when the device 1000 receives a user input requesting the execution of the application 1800, the device 1000 may obtain the storage location at which the application 1800 is installed. Then, the device 1000 may load the execution file of the application 1800 to a memory, may operate the device 1000 according to an execution code in the loaded execution file, and thus may execute the application 1800.

The device 1000 may store the ID information of the executed application 1800. In order to correspond to the ID information of the application 1800, the device 1000 may store ID information of a module that is executed from among the modules that configure the application 1800.

When the device 1000 receives a user input of stopping the execution of the application 1800, the device 1000 may stop the execution of the application 1800. The device 1000 may stop execution of all of the modules that configure the application 1800 or may stop execution of some modules that are predetermined to correspond to the application 1800. The device 1000 may store the ID information of the application 1800 of which execution was stopped. Also, the device 1000 may store ID information of a stopped module and ID information of a module that is continuously executed.

The device 1000 may control the execution of the background module 1900 of the application 1800. For example, the device 1000 may stop or execute the background module 1900. The device 1000 may control the background module 1900 according to a user input or may control the background module 1900 according to a method determined by the device 1000, without a user input.

For example, referring to FIG. 1B, since a time elapses from when the execution of the application 1800 was stopped, the device 1000 may decrease an average execution time of the background module 1900 of the stopped application 1800.

Also, the device 1000 may determine a method of controlling the execution of the background module 1900. For example, based on an execution history of the application 1800 or a characteristic of the background module 1900, the device 1000 may determine an execution method of the background module 1900 to be executed after the execution of the application 1800 is stopped.

Also, if a predetermined time elapses from when the execution of the application 1800 was stopped, the device 1000 may uninstall the application 1800 in the device 1000. Also, if a predetermined time elapses from when the execution of the application 1800 stopped, the device 1000 may extract files related to the application 1800 which are installed in the device 1000 and may generate an installation file of the application 1800. After the application 1800 is uninstalled, if the device 1000 receives an input requesting the execution of the application 1800, the device 1000 may reinstall the application 1800 and may execute the application 1800.

Figure 2:
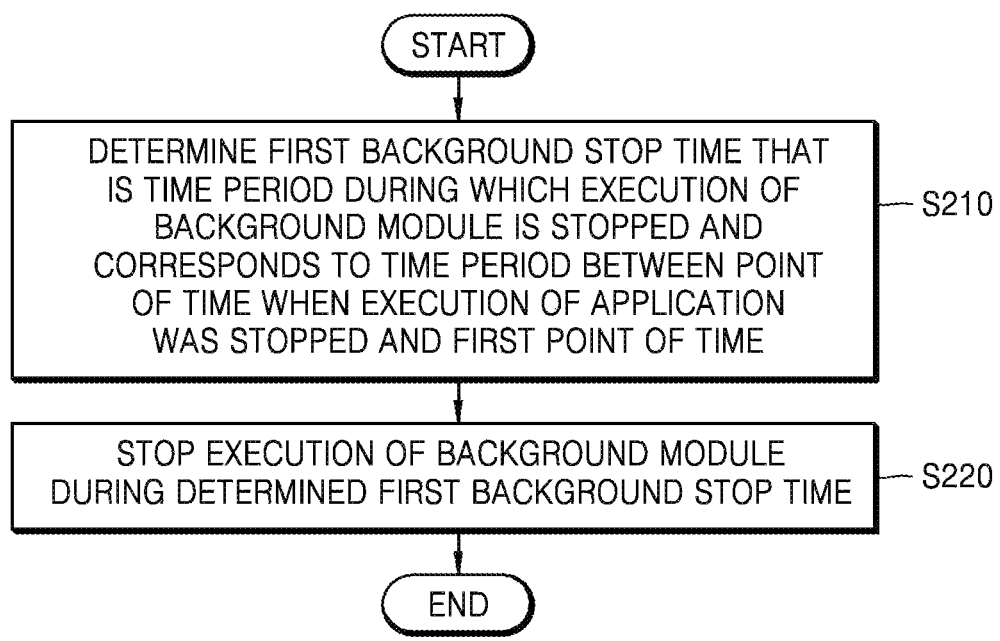
FIG. 2 is a flowchart of a method of controlling the execution of the background module since a time elapses from when the execution of the application was stopped according to an embodiment of the present disclosure.

FIG. 2 is a flowchart of a method of controlling the execution of the background module since a time elapses from when the execution of the application was stopped according to an embodiment of the present disclosure.

In operation S210, the device 1000 may determine a first background stop time, which is a time period during which the execution of the background module 1900 is stopped and corresponds to a time period between a point of time when the execution of the application 1800 stopped and a first point of time.

For example, the device 1000 may determine the first background stop time in proportion to a time period between the point of time when the execution of the application 1800 was stopped and the first point of time.

The first background stop time may mean a time period during which the background module 1900 was stopped. For example, the first background stop time may include a total time period between the first point of time and a second point of time during which the background module 1900 is stopped.

Also, for example, the first background stop time may include a time period between the first point of time and the second point of time, during which the background module 1900 is stopped for a unit time at regular intervals (predetermined time intervals).

The first background stop time may be one of a plurality of predetermined background stop times. The plurality of background stop times may be predetermined so as to correspond to the background module 1900.

For example, based on at least one selected from power consumption, resource use, and network use of the background module 1900, the device 1000 may determine the first background stop time that corresponds to the background module 1900. That is, when the power consumption of the background module 1900 is great, the device 1000 may control an execution time period of the background module 1900 to be decreased while the execution of the application 1800 is stopped. An embodiment related to this will be described below with reference to FIG. 7.

The device 1000 may predetermine the first background stop time before the first point of time. In this case, after the first point of time from when the execution of the application 1800 was stopped, the device 1000 may obtain a predetermined first background stop time.

The first point of time may be one of a plurality of predetermined point of times. The plurality of point of times may indicate points of time to change an execution method of the background module 1900 after the execution of the application 1800 was stopped. The plurality of point of times may be determined to correspond to the application 1800.

For example, the device 1000 may determine the plurality of point of times, based on at least one selected from a number of times of execution, an execution interval at which executions are performed (hereinafter, referred to as "execution interval"), and an execution time period of the application 1800. For example, when the number of times of execution or an average execution time period of the application 1800 is increased, the device 1000 may determine the first point of time so as to increase the time period between the point of time when the execution of the application 1800 was stopped and the first point of time. An embodiment related to this will be described below with reference to FIG. 6.

In operation S220, the device 1000 may stop the execution of the background module 1900 during the determined first background stop time.

After the first point of time from when the execution of the application 1800 was stopped, the device 1000 may stop the execution of the background module 1900 during the first background stop time that is determined in operation S210.

The device 1000 may stop the execution of the background module 1900 during the first background stop time while a time elapses from the first point of time to the second point time. The device 1000 may constantly stop the background module 1900 during a background stop time. Alternatively, the device 1000 may periodically stop the background module 1900 during the background stop time.

When a certain time elapses from when the execution of the application 1800 was stopped, the device 1000 may uninstall the application 1800 that was installed in the device 1000.

After the application 1800 is uninstalled, if the device 1000 receives a user input requesting an execution of the application 1800, the device 1000 may reinstall the application 1800. An embodiment related to this will be described below with reference to FIGS. 8, 9, and 10.

Hereinafter, a method of controlling the background module 1900 after the execution of the application 1800 was stopped, the method performed by the device 1000, will be described in detail with reference to FIGS. 3, 4, and 5.

Figure 3:
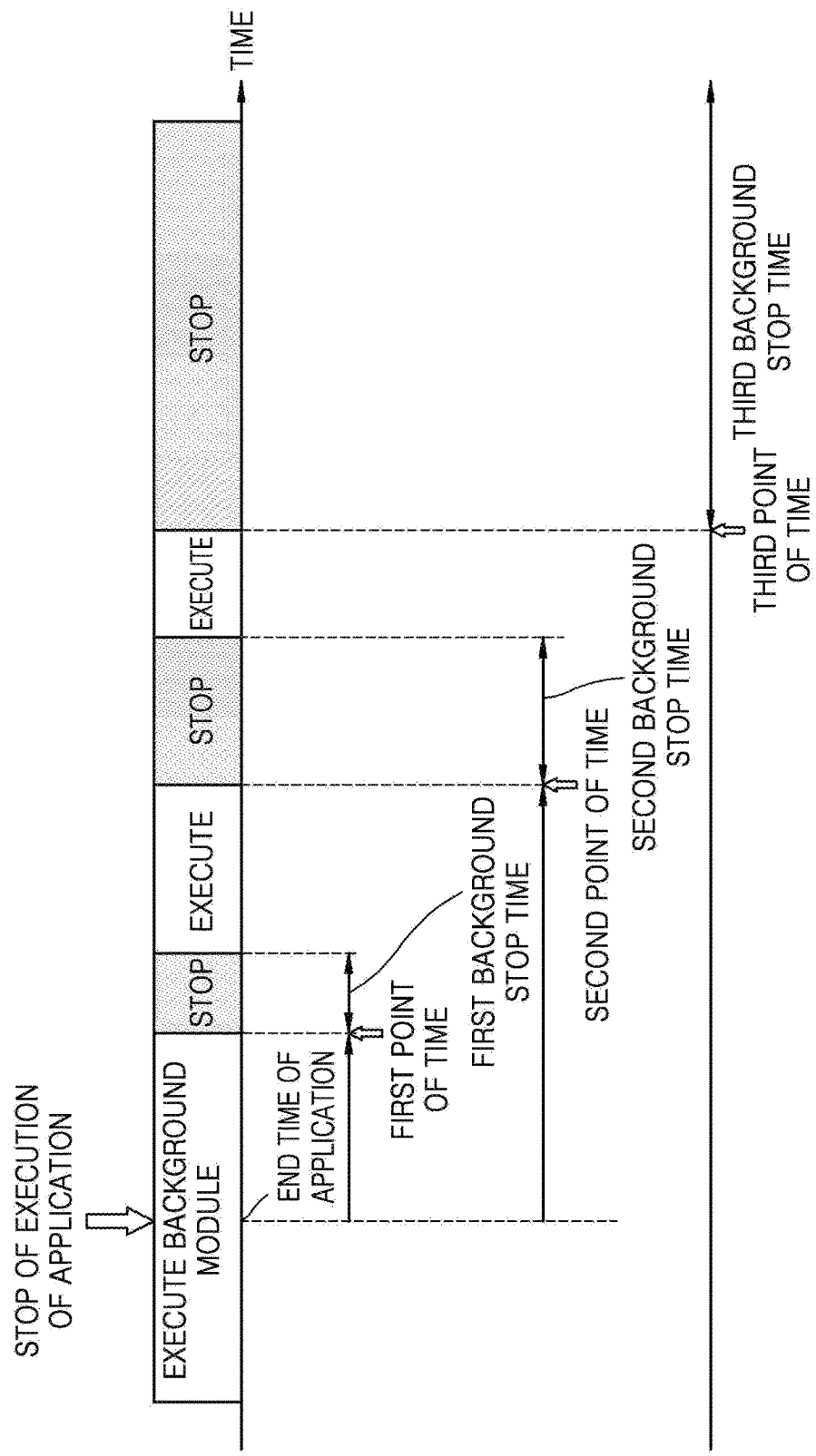
FIG. 3 illustrates a method of controlling the application according to an embodiment of the present disclosure.

FIG. 3 illustrates a method of controlling the application 1800 according to an embodiment of the present disclosure.

Referring to FIG. 3, the background module 1900 may be continuously executed after the execution of the application 1800 was stopped. In FIG. 3, it is assumed that a plurality of points of time and a plurality of background stop times are predetermined by the device 1000 before the execution of the application 1800 was stopped.

Since a time elapses from when the execution of the application 1800 was stopped, the device 1000 may determine whether it is after a first point of time. If the device 1000 determines that it is after the first point of time, the device 1000 may stop the execution of the background module 1900.

Since the execution of the background module 1900 is stopped, the device 1000 may obtain a first background stop time that corresponds to a time period between the point of time when the execution of the application 1800 is stopped and the first point of time.

Since a time elapses, the device 1000 may determine whether the first background stop time has elapsed from the first point of time. If the device 1000 determines that the first background stop time has elapsed from the first point of time, the device 1000 may re-execute the stopped background module 1900.

When the background module 1900 is re-executed, the device 1000 may determine whether it is after a second point of time from when the execution of the application 1800 was stopped. If the device 1000 determines that it is after the second point of time from when the execution of the application 1800 was stopped, the device 1000 may re-stop the re-executed background module 1900. Also, the device 1000 may obtain a second background stop time that corresponds to a time period between the point of time when the execution of the application 1800 was stopped and the second point of time. The second background stop time may be greater than the first background stop time.

Afterward, the device 1000 may stop the background module 1900 during the second background stop time and then may re-execute the background module 1900 from the end point of the second background stop time to a third point of time.

After the first point of time, the second point of time, and the third point of time, background stop times corresponding thereto also increase, so that the device 1000 may gradually decrease an execution time of the background module 1900.

Also, after the third point of time, the device 1000 may not re-execute the background module 1900 until the device 1000 receives an input requesting execution of the application 1800.

Therefore, since a time elapses after the execution of the application 1800 was stopped, the device 1000 may gradually decrease the execution time of the background module 1900 so that the device 1000 may decrease power consumption and a resource usage.

FIG. 4 is a flowchart of a method of periodically controlling execution of the background module since a time elapses from when execution of the application was stopped according to an embodiment of the present disclosure.

Referring to FIG. 4, in operation S410, the device 1000 may stop the application 1800 that is currently executed in the device 1000.

The execution of the application 1800 may be stopped in response to a stop command from a user. For example, while the device 1000 executes the application 1800, if the device 1000 receives a user input of stopping the application 1800, the device 1000 may stop the execution of the application 1800. Alternatively, the execution of the application 1800 may be stopped by an operating system. Alternatively, the execution of the application 1800 may be stopped by another application 1800.

Since the execution of the application 1800 is stopped, the device 1000 may store a point of time when the execution of the application 1800 is stopped.

In operation S420, since it is after a first point of time, the device 1000 may stop execution of the background module 1900.

Since a time elapses after the execution of the application 1800 was stopped, the device 1000 may determine an elapse of a time period between the point of time when the execution of the application 1800 was stopped and the first point of time.

For example, the device 1000 may an event that will occur if the time period between the point of time when the execution of the application 1800 was stopped and the first point of time has elapsed, when the device 1000 determines that the execution of the application 1800 was stopped.

Since the time period between the point of time when the execution of the application 1800 was stopped and the first point of time has elapsed, the device 1000 may generate a time event so as to notify that it is after the first point of time. When the device 1000 determines that the time event has occurred, the device 1000 may determine that it is after the first point of time.

The device 1000 may have a list of the background modules 1900 that configure the applications 1800, respectively. Also, the device 1000 may determine not only the execution of the application 1800 but may also determine execution of the background module 1900 of the application 1800.

Accordingly, when the device 1000 determines that it is after the first point of time, the device 1000 may stop the execution of the background module 1900.

The device 1000 may stop execution of all of the background modules 1900 of the application 1800. Alternatively, the device 1000 may stop execution of only some modules from among the background modules 1900 of the application 1800.

In operation S430, the device 1000 may determine whether a first background stop time per unit time has elapsed from when the execution of the background module 1900 was stopped.

Since the background module 1900 is stopped, the device 1000 may obtain the first background stop time per unit time that corresponds to the time period between the point of time when the execution of the application 1800 was stopped and the first point of time.

Also, since a time elapses, the device 1000 may determine whether the first background stop time per unit time has elapsed from when the background module 1900 was stopped.

For example, the device 1000 may set an event will occur if the first background stop time per unit time has elapsed from when the background module 1900 was stopped, when the device 1000 determines that the background module 1900 was stopped. When the time event occurs, the device 1000 may determine that the first background stop time per unit time has elapsed.

In operation S440, if the first background stop time per unit time has elapsed, the device 1000 may re-execute the background module 1900.

Since the first background stop time per unit time has elapsed, the device 1000 may re-execute the background module 1900 that was stopped in operation S430.

In operation S450, since a unit time elapses from when the execution of the background module 1900 was stopped, the device 1000 may re-stop the background module 1900.

The device 1000 may determine whether the unit time has elapsed from when the execution of the background module 1900 was stopped. If the device 1000 determines that the unit time has elapsed from when the execution of the background module 1900 was stopped, the device 1000 may re-stop the background module 1900.

The device 1000 may repeatedly perform operations S420 through S450 between the first point of time and the second point time. Accordingly, the device 1000 may stop the execution of the background module 1900 at every unit time between the first point of time and the second point time during the first background stop time per unit time.

The device 1000 may stop the execution of the background module 1900 at every unit time between a second point of time and a third point of time during a second background stop time per unit time that corresponds to a time period between the point of time when the execution of the application 1800 was stopped and the second point of time.

FIG. 5 illustrates an example in which the device periodically controls execution of the background module since a time elapses from when execution of the application was stopped, according to an embodiment of the present disclosure.

Referring to FIG. 5, the background module 1900 may be continuously executed after the execution of the application 1800 was stopped. In the embodiment of FIG. 5, it is assumed that a plurality of points of time and a plurality of background stop times per unit time are predetermined by the device 1000 before the execution of the application 1800 was stopped.

Since a time elapses from when the execution of the application 1800 was stopped, the device 1000 may determine whether it is after a first point of time. If the device 1000 determines that it is after the first point of time, the device 1000 may stop the execution of the background module 1900. Also, the device 1000 may obtain a first background stop time per unit time that corresponds to a time period between the point of time when the execution of the application 1800 is stopped and the first point of time.

Since the execution of the background module 1900 was stopped, the device 1000 may determine whether the first background stop time per unit time has elapsed from the first point of time. If the device 1000 determines that the first background stop time per unit time has elapsed from the first point of time, the device 1000 may re-execute the stopped background module 1900.

Since the background module 1900 is re-executed, the device 1000 may determine whether a unit time 510 has elapsed from when the execution of the background module 1900 was stopped. The unit time 510 may indicate an interval at which the execution of the background module 1900 is stopped. For example, the unit time 510 may be set as 30 minutes, 1 hour, or 1 day.

If the unit time 510 has elapsed from when the execution of the background module 1900 was stopped, the device 1000 may re-stop the execution of the background module 1900.

The device 1000 may repeat operations, which were performed from the first point of time during the unit time 510, from the first point of time to a second point of time.

Accordingly, the device 1000 may periodically execute the background module 1900, thus, even when an execution time of the background module 1900 is decreased, the device 1000 may rapidly provide user-requested information when a user re-executes the application 1800.

According to an elapse of time, the device 1000 may determine whether a time has elapsed from when the execution of the application 1800 was stopped to a second point of time. If the time has elapsed to the second point of time, the device 1000 may stop the execution of the background module 1900. Also, the device 1000 may obtain a second background stop time per unit time that corresponds to a time period between the point of time when the execution of the application 1800 was stopped and the second point of time. In this case, the second background stop time per unit time may be greater than the first background stop time per unit time.

Since the background module 1900 was stopped, the device 1000 may determine whether the second background stop time per unit time has elapsed from the second point of time. If the device 1000 determines that the second background stop time per unit time has elapsed from the second point of time, the device 1000 may re-execute the stopped background module 1900.

Since the background module 1900 is re-executed, the device 1000 may determine whether the unit time 510 has elapsed from when the execution of the background module 1900 was stopped. If the unit time 510 has elapsed from the second point of time when the execution of the background module 1900 was stopped, the device 1000 may re-stop the execution of the background module 1900.

The device 1000 may repeat operations, which were performed from the second point of time during the unit time 510, from the second point of time to a third point of time.

Referring to FIG. 5, since a time elapses from when the execution of the application 1800 was stopped, a background stop time per unit time may be increased. For example, the second background stop time per unit time may have a greater value than the first background stop time per unit time, and a third background stop time per unit time may have a greater value than the second background stop time per unit time. Accordingly, while the execution of the application 1800 was stopped, an execution time of the background module 1900 may be decreased.

The device 1000 may determine whether a time has elapsed from when the execution of the application 1800 was stopped to a fourth point of time. If the time has elapsed to the fourth point of time, the device 1000 may stop the execution of the background module 1900. Since the execution of the background module 1900 is stopped, the device 1000 may not re-execute the background module 1900. Accordingly, when a certain time period elapses from when the execution of the application 1800 was stopped, the background module 1900 may not be executed.

The device 1000 may determine whether a time has elapsed from when the execution of the application 1800 was stopped to a fifth point of time. If the time has elapsed to the fifth point of time, the device 1000 may uninstall the application 1800. Alternatively, the device 1000 may delete all files related to the application 1800, except for the installation file of the application 1800. An embodiment related to this will be provided below with reference to FIGS. 8 and 9.

If the device 1000 receives a user input requesting the execution of the application 1800 during a time period between the point of time when the execution of the application 1800 was stopped and the fifth point of time, the device 1000 may entirely re-execute the application 1800 including the background module 1900.

FIG. 6 illustrates a method of determining an execution time of the background module based on a use history of the application according to an embodiment of the present disclosure.

The device 1000 may obtain information about execution of the application 1800. For example, when the application 1800 is executed, the device 1000 may check a point of time when execution of the application 1800 is started and a point of time when the execution of the application 1800 is ended, and may calculate an execution time of the application 1800, a total number of times that the application 1800 is executed, or the like.

The device 1000 may determine a user's use pattern of the application 1800, based on the information about the execution of the application 1800. The use pattern of the application 1800 may be determined to correspond to each application 1800. The use pattern of the application 1800 may include an average execution time of the application 1800, an average number of times of executing the application 1800, an execution interval, a time of a day when the application 1800 is mainly executed, or a day of a week when the application 1800 is executed.

The device 1000 may determine, based on the use pattern of the application 1800, a method of controlling execution of the background module 1900 after the execution of the application 1800 is stopped.

For example, the device 1000 may determine, based on the use pattern of the application 1800, a plurality of points of time and an expected deletion time of the application 1800.

For example, when the average execution time of the application 1800 or the average number of times of executing the application 1800 is decreased, the device 1000 may set the plurality of points of time and the expected deletion time of the application 1800 so that a time period between a point of time when the execution of the application 1800 was stopped and the plurality of points of time and the expected deletion time of the application 1800 may be decreased.

Referring to FIG. 6, an application 2 has an execution time per week 610 and a number of times of execution per week 620. Accordingly, the device 1000 may determine a plurality of check points of time 630 for the application 1 as 2 weeks, 4 weeks, 6 weeks, and 8 weeks. Also, the device 1000 may determine an expected deletion time 640 for the application 1 as 9 weeks. On the other hand, the device 1000 may determine the plurality of check points of time 630 for the application 2 as 1 week, 4 weeks, 5 weeks, and 6 weeks and may determine the expected deletion time 640 for the application 2 as 7 weeks.

Thus, if the application 1800 is not frequently used by the user, after the execution of the application 1800 is ended, the execution time of the background module 1900 may be decreased. Also, after the execution of the application 1800 is ended, the application 1800 that is not frequently used by the user may be further quickly deleted.

FIG. 7 illustrates a method of determining an execution time of the background module based on a characteristic of the background module according to an embodiment of the present disclosure.

Referring to FIG. 7, the device 1000 may obtain the characteristic of the background module 1900. The characteristic of the background module 1900 may include at least one selected from power consumption, a network use, and a central processing unit (CPU) use rate.

For example, when the background module 1900 is executed, the device 1000 may calculate the network use or the CPU use rate of the background module 1900. Also, the device 1000 may estimate the power consumption of the background module 1900, based on the calculated network use or the calculated CPU use rate of the background module 1900.

The device 1000 may determine, based on the characteristic of the background module 1900, the method of controlling the execution of the background module 1900 after the execution of the application 1800 is stopped. The device 1000 may determine a background stop time, based on the characteristic of the background module 1900. For example, the device 1000 may increase the background stop time when the power consumption, the network use, or the CPU use rate of the background module 1900 is great.

Referring to FIG. 7, a network use 710 and a CPU use rate 720 of the background module 1900 of the application 1 are greater than the network use 710 and the CPU use rate 720 of the background module 1900 of the application 2. Accordingly, the device 1000 may set a background stop time 730 of the application 1 as 30 minutes, 40 minutes, and 50 minutes. On the other hand, the device 1000 may set the background stop time 730 of the application 2 as 20 minutes, 30 minutes, and 40 minutes.

Therefore, when the power consumption, the network use, or the CPU use rate of the background module 1900 is increased, the execution time of the background module 1900 may be decreased.

FIG. 8 is a flowchart of a method of deleting the application since a time elapses from when execution of the application was stopped according to an embodiment of the present disclosure.

Referring to FIG. 8, in operation S810, the device 1000 may determine whether an expected deletion time of the application 1800 has elapsed from when execution of the application 1800 was stopped.

The expected deletion time of the application 1800 may be determined based on at least one selected from a use pattern of the application 1800 and a characteristic of the background module 1900.

If the device 1000 determines that the expected deletion time of the application 1800 has elapsed in operation S810, the device 1000 may determine whether an installation file of the application 1800 is stored in the device 1000 in operation S820.

In order to correspond to the ID information of the application 1800, the device 1000 may store whether the installation file of the application 1800 is stored therein. Alternatively, the device 1000 may scan a storage location where installation files of the application 1800 are collectively stored and may determine whether the installation file of the application 1800 exists therein.

If the installation file of the application 1800 is not stored in the device 1000 in operation S820, the device 1000 may generate the installation file of the application 1800, based on a storage location at which the application 1800 was installed in operation S830.

For example, the device 1000 may obtain the storage location at which the application 1800 was installed. In order to correspond to the ID information of the application 1800, the device 1000 may store the storage location, in the form of a file or a database, at which the application 1800 was installed. Accordingly, the device 1000 may obtain a storage location at which necessary files for the installation file of the application 1800 were stored to correspond to the ID information of the application 1800.

The device 1000 may extract, from the obtained storage location, the execution file of the application 1800, a resource file of the application 1800, an information file about the application 1800, and an information file and an authentication file about an execution authority of the application 1800. Afterward, the device 1000 may package the extracted files and may re-generate an installation file of the application 1800. For example, the device 1000 may compress the extracted files into at least one file by using a predetermined method and may re-generate the installation file.

In this case, the device 1000 may re-generate the installation file of the application 1800 such that the installation file may be configured of same files as an original file. Also, the device 1000 may re-generate the installation file of the application 1800 in such a manner that the installation file may include not only original files that configure the distributed installation file of the application 1800 but may also include data that was generated by executing the application 1800. The data that was generated by executing the application 1800 may include data about a user's use of the application 1800, at least one file that was generated by executing the application 1800, or the like. In one or more various embodiments, the re-generated installation file of the application 1800 may be referred to as a backup file of the application 1800.

In operation S840, the device 1000 may store the re-generated installation file of the application 1800.

The device 1000 may store the re-generated installation file of the application 1800 in a preset installation file storage location. Also, in order to correspond to the ID information of the application 1800, the device 1000 may store the storage location in which the re-generated installation file of the application 1800 is stored.

In operation S850, the device 1000 may uninstall the application 1800 that was installed in the device 1000.

The device 1000 may uninstall the application 1800 by deleting files and a plurality of pieces of data that are related to the application 1800, except for the re-generated installation file of the application 1800.

For example, the device 1000 may delete the execution file, the resource file, etc. of the application 1800 that are stored in the device 1000. Also, the device 1000 may delete data or a file that was generated by executing the application 1800. The device 1000 may delete information about the uninstalled application 1800 from a plurality of pieces of information about the applications 1800 installed in the device 1000. Also, the device 1000 may store ID information of the application 1800 that was uninstalled since the application 1800 was not used for a predetermined period.

Before the device 1000 uninstalls the application 1800 in the device 1000, the device 1000 may display a user interface for receiving an input for selecting whether to uninstall the application 1800. The device 1000 may uninstall the application 1800 only when the device 1000 receives a user input selecting to uninstall the application 1800.

Therefore, the device 1000 may uninstall the application 1800 that has not been used for a predetermined period and may increase a usable volume of a storage unit. In particular, when the application 1800 is installed, the application 1800 may be set to be installed at a preset location such as a system drive in which an operating system was installed. In this case, the device 1000 may delete unnecessary files related to the application 1800 and thus may increase a storage volume in which another application 1800 may be installed.

Figure 9A:
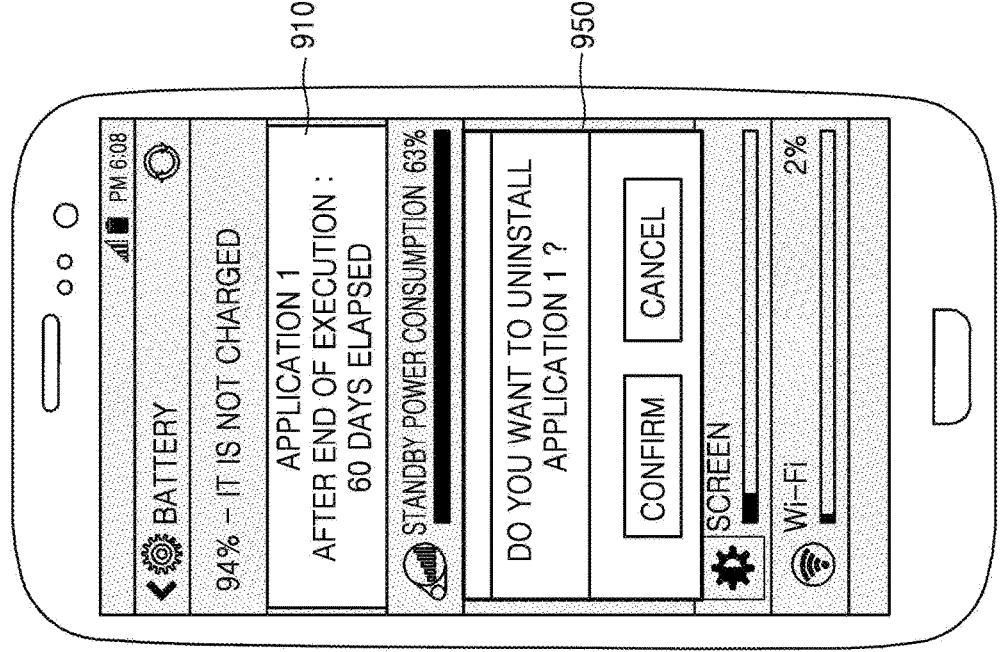
FIGS. 9A and 9B illustrate examples in which the application is uninstalled according to an embodiment of the present disclosure.
Figure 9B:
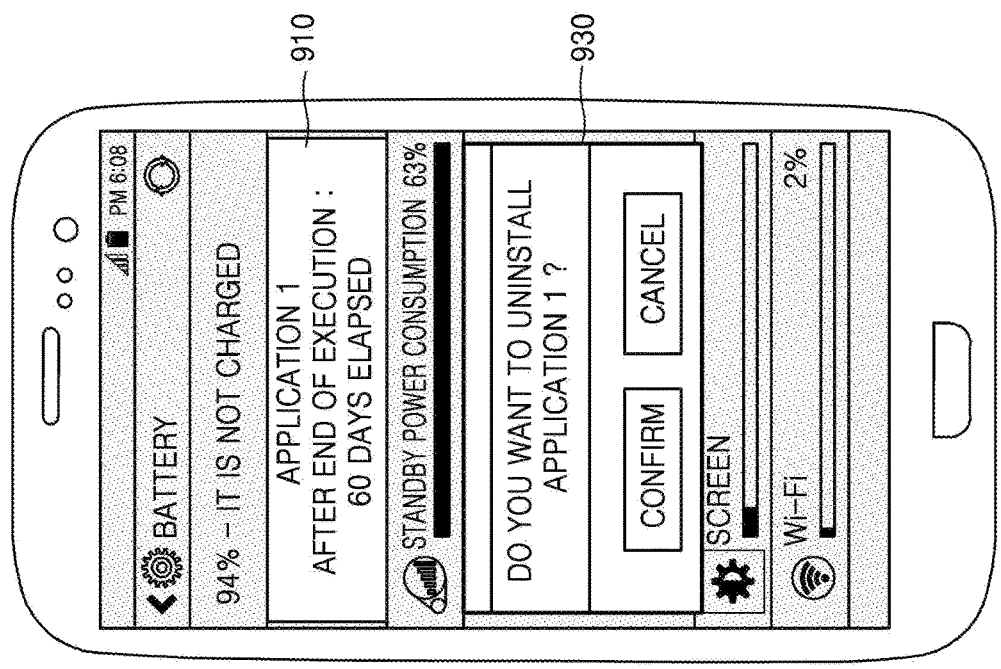

FIGS. 9A and 9B illustrate examples in which the application is uninstalled according to an embodiment of the present disclosure.

Referring to FIG. 9A, before the device 1000 uninstalls the application 1800, the device 1000 may display a user interface 930 for receiving an input for selecting whether to uninstall the application 1800.

If the device 1000 receives a user input selecting to uninstall the application 1800, the device 1000 may uninstall the application 1800. If the device 1000 receives a user input for selecting not to uninstall the application 1800, the device 1000 may not uninstall the application 1800 but may maintain a pause of the background module 1900 of the application 1800 until the device 1000 receives an input requesting execution of the application 1800.

Referring to FIG. 9B, the device 1000 may display a user interface 950 for receiving an input for selecting whether to delete the application 1800 in the device 1000.

If the application 1800 has not been executed for a predetermined period, the device 1000 may display a user interface for receiving an input for selecting whether to delete the application 1800. Also, only when the device 1000 receives the user input selecting to install the application 1800 in the example of FIG. 9A, the device 1000 may display the user interface 950 for receiving an input for selecting whether to delete the application 1800.

If the device 1000 receives the user input selecting to uninstall the application 1800, the device 1000 may uninstall the application 1800 and may also delete the installation file of the application 1800.

Also, the device 1000 may also display information 910 indicating an elapsed time period from when the execution of the application 1800 was stopped. Also, the device 1000 may display power that is consumed while the application 1800 is stopped. The device 1000 may also display a characteristic of the background module 1900 of the application 1800. Also, the device 1000 may display information indicating a user's use history of the application 1800 or a user's use pattern of the application 1800. The device 1000 may also display information indicating a size of the installation file of the application 1800.

Thus, the device 1000 may delete the applications 1800 that are determined as unnecessary applications by a user, so that power consumption of the device 1000 may be decreased and storage of the device 1000 may be efficiently used.

Figure 10:
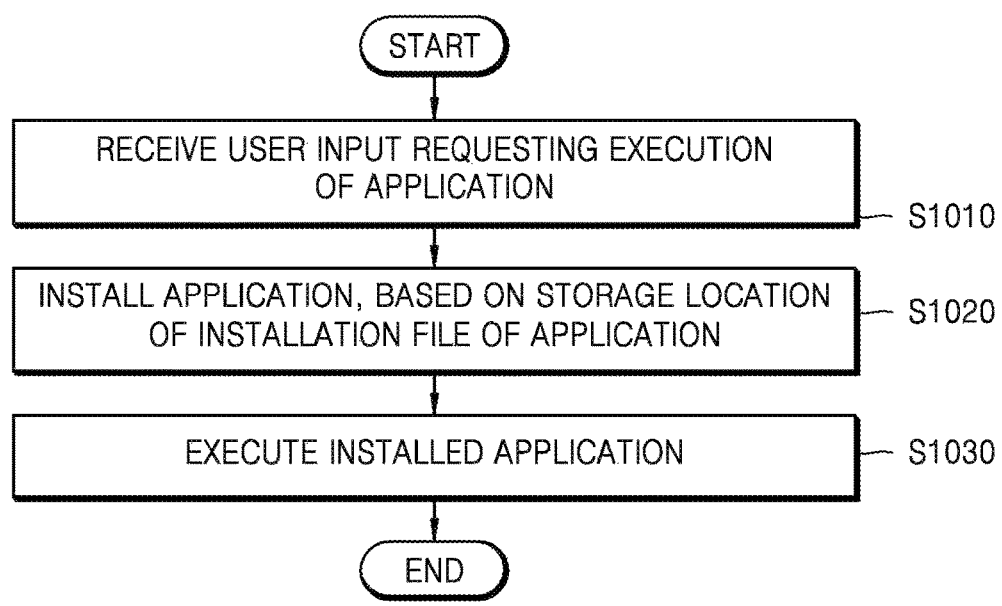
FIG. 10 is a flowchart of a method of reinstalling and executing the application when a user input requesting execution of the application is received after the application is uninstalled according to an embodiment of the present disclosure.

FIG. 10 is a flowchart of a method of reinstalling and executing the application when a user input requesting execution of the application is received after the application is uninstalled according to an embodiment of the present disclosure.

In operation S1010, the device 1000 may receive a user input requesting the execution of the application 1800.

After the application 1800 was uninstalled, the device 1000 may receive the user input requesting the execution of the application 1800.

For example, the device 1000 may store ID information of the application 1800 that was uninstalled since the application 1800 had not been used for a predetermined period. Also, before the device 1000 uninstalls the application 1800, if an installation file of the application 1800 is not stored, the device 1000 may re-generate the installation file of the application 1800.

Also, the device 1000 may store the re-generated installation file of the application 1800 in a preset storage location. Then, in order to correspond to the ID information of the application 1800, the device 1000 may store information about the storage location in which the re-generated installation file of the application 1800 is stored.

Accordingly, based on the ID information of the application 1800 of which installation file is stored and that was uninstalled since it had not been used for a predetermined period, the device 1000 may display an interface for receiving a user input requesting execution of the application 1800. For example, the device 1000 may display a list of the applications 1800 that were uninstalled but are re-executable by using stored installation files.

In operation S1020, the device 1000 may install the application 1800, based on the storage location of the re-generated installation file of the application 1800.

If the device 1000 receives a user input selecting the uninstalled application 1800, the device 1000 may obtain a storage location of an installation file of the selected application 1800, in order to correspond to ID information of the selected application 1800. Then, the device 1000 may reinstall the application 1800, based on the obtained storage location.

For example, the device 1000 may generate a logical storage for installation of the application 1800. For example, the device 1000 may generate a directory for storing the installation file and a directory for storing necessary data for the execution of the application 1800.

Afterward, the device 1000 may decompress the installation file of the selected application 1800 and may extract the installation file, a resource file, or the like of the selected application 1800. Then, the device 1000 may store the extracted installation file, the resource file, or the like of the selected application 1800 in the generated logical storage.

The installation file of the selected application 1800 may be an installation file that is re-generated in the device 1000. In this case, the installation file of the selected application 1800 may include data that was generated when the selected application 1800 was executed in the device 1000 before the installation file is re-generated. The data that was generated according to the execution of the selected application 1800 may include data about a use of the selected application 1800, a file that was generated by executing the selected application 1800, or the like.

If the installation file of the selected application 1800 further includes the data that was generated according to the execution of the selected application 1800, the device 1000 may store the included data in a same directory in which the data was generated. Accordingly, if the device 1000 installs the re-generated installation file of the selected application 1800 in the device 1000, the device 1000 may provide a user with an execution environment of the selected application 1800 and user data that are same as those of the selected application 1800 when the installation file of the selected application 1800 was re-generated.

The device 1000 may allocate ID information of the selected application 1800 in order to correspond to the installed application 1800. Also, in order to correspond to the ID information of the installed application 1800, the device 1000 may store, in the form of a file or a database, the storage location of the installation file of the selected application 1800 and the storage location of the selected application 1800.

In operation S1030, the device 1000 may execute the installed application 1800. The device 1000 may obtain the storage location at which the application 1800 is installed. Then, the device 1000 may load the execution file of the application 1800 to a memory, may operate the device 1000 according to an execution code in the loaded execution file, and thus may execute the application 1800.

Figure 11A:
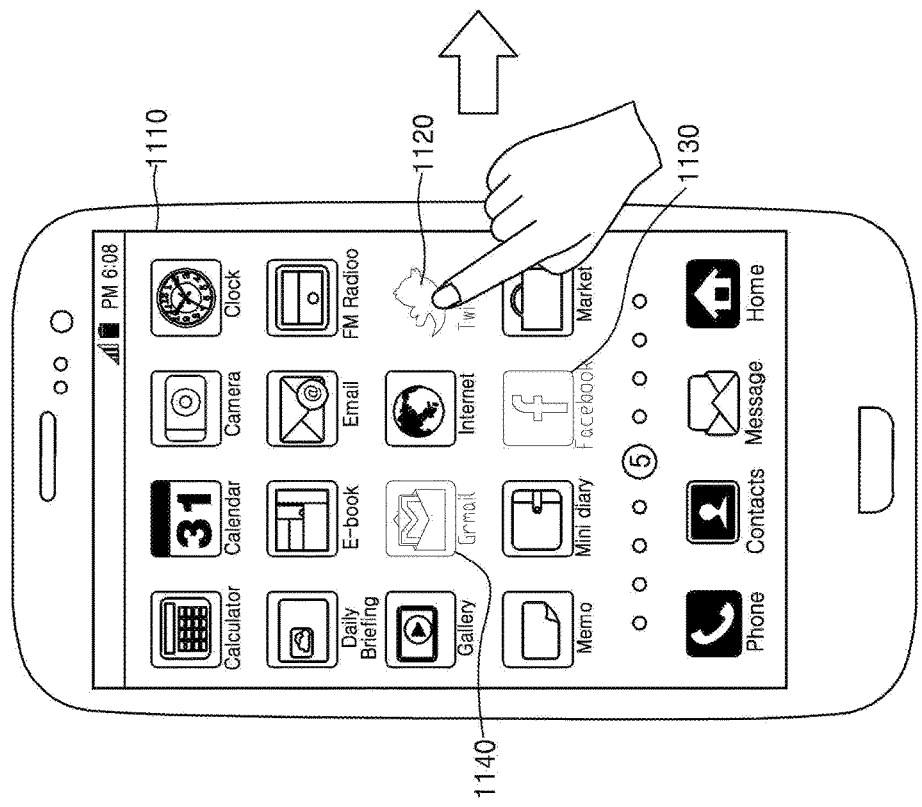
FIGS. 11A and 11B illustrate a method of reinstalling and executing the application when a user input requesting execution of the application is received after the application is uninstalled according to the embodiment of FIG. 10.
Figure 11B:
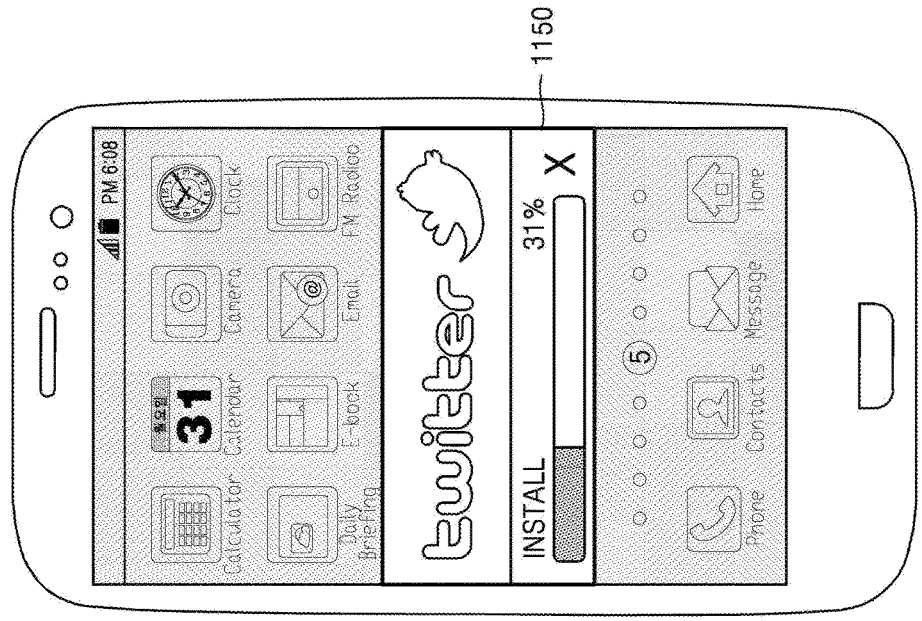

FIGS. 11A and 11B illustrate a method of reinstalling and executing the application when a user input requesting execution of the application is received after the application is uninstalled according to the embodiment of FIG. 10.

Referring to FIGS. 11A and 11B, the device 1000 may display an interface for receiving a user input requesting execution of the application 1800, based on ID information of the application 1800 of which installation filed is stored but that was uninstalled since the application 1800 had not been used for a predetermined period.

Referring to FIG. 11A, the device 1000 may display a user interface 1110 that shows the applications 1800 that are executable in the device 1000. In this case, the device 1000 may also display user interfaces 1120, 1130, and 1140 that indicate the applications 1800 that were uninstalled.

The device 1000 may differ in displaying a user interface indicating the uninstalled application 1800 and displaying a user interface indicating the application that is installed in the device 1000.

Referring to FIG. 11B, if the device 1000 receives a user input selecting the uninstalled application 1800, in order to correspond to ID information of the selected application 1800, the device 1000 may obtain a storage location of an installation file of the selected application 1800. Then, the device 1000 may install the selected application 1800 by using the obtained installation file of the selected application 1800. In this case, the device 1000 may display a user interface 1150 indicating that the selected application 1800 is being installed. Also, the device 1000 may execute the installed application 1800.

Figure 12:
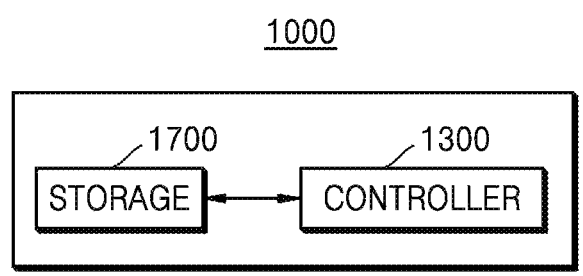
FIGS. 12 and 13 are block diagrams of the device, according to various embodiments of the present disclosure.
Figure 13:
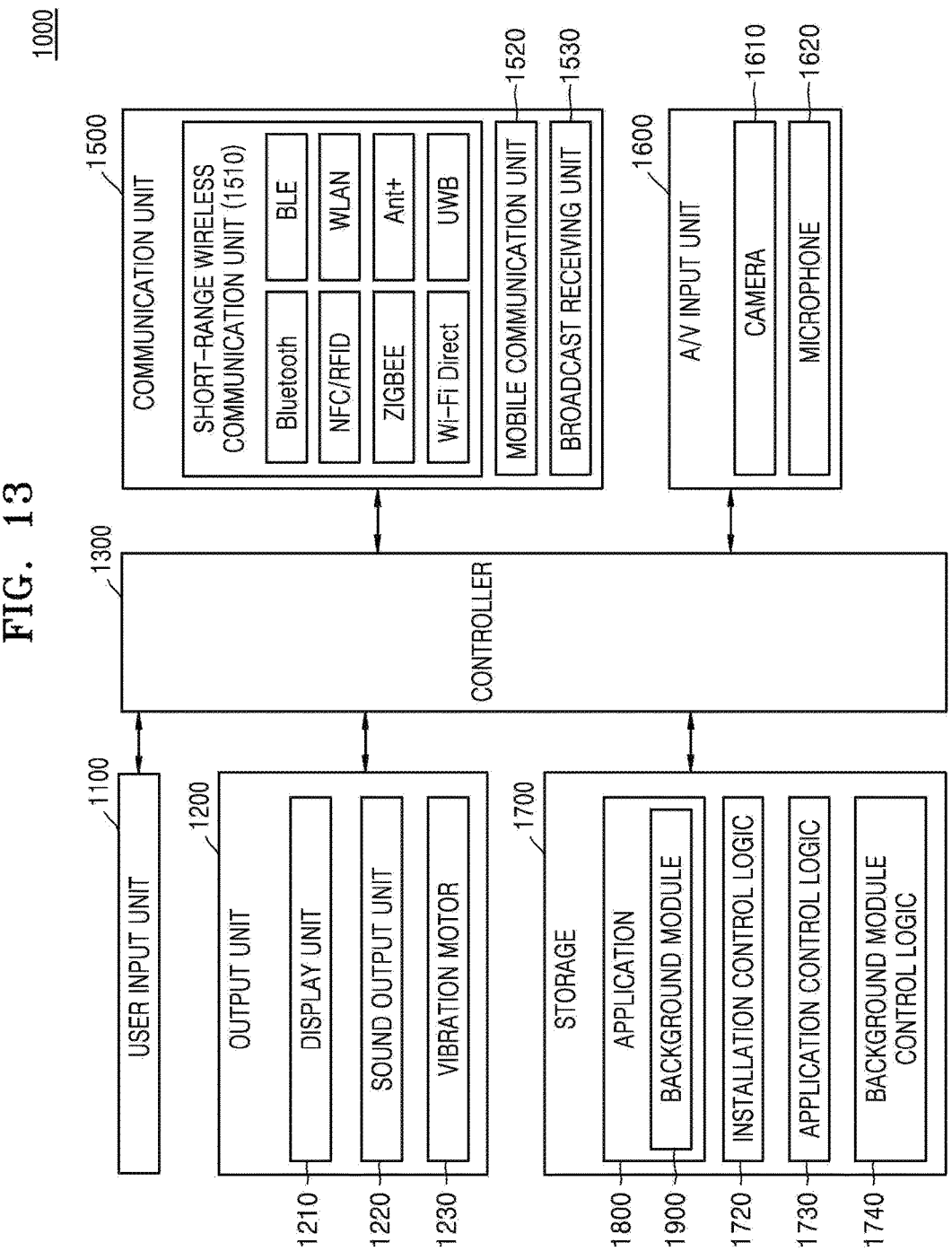

FIGS. 12 and 13 are block diagrams of the device, according to various embodiments of the present disclosure.

Referring to FIGS. 12 and 13, a device 1000 may include a storage 1700 and a controller 1300. However, not all elements shown in FIG. 12 are necessary elements. That is, the device 1000 may be embodied with more or less elements than the elements shown in FIG. 12.

For example, referring to FIG. 13, the device 1000 may further include a user input unit 1100, a display unit 1210, an output unit 1200, a communication unit 1500, and an audio/video (A/V) input unit 1600, as well as the storage 1700 and the controller 1300.

Hereinafter, the elements are described below.

Referring to FIG. 12, the storage 1700 may store a program that is processed and controlled by the controller 1300 or may store input/output data.

Also, the storage 1700 may store at least one program for controlling the background module 1900. The at least one program may include an execution code for determining a first background stop time that is a time period to stop execution of the background module 1900 so as to correspond to a time period between a point of time when the execution of the application 1800 was stopped and a first point of time, and an execution code for stopping the execution of the background module 1900 during the determined first background stop time.

The execution code for stopping the execution of the background module 1900 may include a phase of stopping the execution of the background module 1900 since it is after the first point of time, a phase of determining whether a first background stop time per unit time elapsed, and if the first background stop time per unit time elapsed, re-executing the background module 1900.

The at least one program may further include an execution code for uninstalling the application 1800 in a mobile terminal since it is after a last point of time, from among a plurality of points of time, from when the execution of the application 1800 was stopped.

The execution code for uninstalling the application 1800 may include generating an installation file of the application 1800 based on a storage location at which the application 1800 was installed, storing the installation file of the application 1800, and uninstalling the application 1800.

Also, the execution code for uninstalling the application 1800 may further include displaying a user interface for receiving an input for selecting whether to uninstall the application 1800 and uninstalling the application 1800 based on a user input selecting to uninstall the application 1800.

Also, the at least one program may further include an execution code for receiving a user input requesting execution of the application 1800, an execution code for installing the application 1800, based on a storage location of the installation file of the application 1800, upon receipt of a user input requesting the execution of the application 1800, and an execution code for executing the application 1800.

The storage 1700 may include a storage medium of at least one type of a flash memory, a hard disk, a multimedia card type memory, a card type memory such as a Secure Digital (SD) or extreme Digital (XD) card memory, a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disc. Also, the device 1000 may run web storage or a cloud server that performs a storage function of the storage 1700 on the Internet.

The controller 1300 generally controls operations of the device 1000. For example, the controller 1300 may execute programs stored in the storage 1700 and thus may control the user input unit 1100, the output unit 1200, a sensor (not shown), the communication unit 1500, the AN input unit 1600, and the like.

Also, the controller 1300 may execute a program stored in the storage 1700 and thus may control the application 1800, which includes the background module 1900. The controller 1300 may load the program stored in the storage 1700 to a memory, may operate the device 1000 according to an execution code of the loaded program, and thus may control the application 1800 having the background module 1900.

Referring to FIG. 13, the storage 1700 may include the application 1800, an installation control logic 1720, an application control logic 1730, and a background module control logic 1740. The application 1800 may include the background module 1900.

The installation control logic 1720, the application control logic 1730, and the background module control logic 1740 may be implemented as software. The installation control logic 1720, the application control logic 1730, and the background module control logic 1740 may be executed by the controller 1300 in a manner that their functions may be performed. Although not illustrated, in another embodiment, the installation control logic 1720, the application control logic 1730, and the background module control logic 1740 may not be implemented as software, but may also be an integrated circuit logic in the device 1000.

Hereinafter, the functions of the installation control logic 1720, the application control logic 1730, and the background module control logic 1740 that are executed by the controller 1300 are described below.

The application control logic 1730 and the background module control logic 1740 may have a control authority that is higher than a control authority of the applications 1800 with respect to another application 1800.

Thus, the background module control logic 1740 may exclusively control the background module 1900. For example, when the background module control logic 1740 stops execution of the background module 1900, the application control logic 1730 may re-execute the background module 1900 in response to a user input, but the background module control logic 1740 may limit another application 1800 in randomly executing the stopped background module 1900.

To do so, the application control logic 1730 and the background module control logic 1740 may be implemented as framework level software that controls execution of the applications 1800.

The installation control logic 1720 may download an installation file of the application 1800 from an external server or an external device to the device 1000. The installation control logic 1720 may store the downloaded installation file of the application 1800 in a predetermined logical storage location of the storage 1700.

The installation file of the application 1800 may indicate a distributed file to make the application 1800 installed in the device 1000. The installation file of the application 1800 may include an execution file of the application 1800 and a resource file for the execution file of the application 1800. Also, the installation file of the application 1800 may further include an information file such as a title or a version of the application 1800, and an information file and an authentication file about an execution authority of the application 1800.

The installation control logic 1720 may install the application 1800, based on the installation file of the application 1800.

For example, the installation control logic 1720 may generate a logical storage in which the application 1800 is to be installed. The installation control logic 1720 may generate a directory for storing the installation file and a directory for storing necessary data for the execution of the application 1800. The necessary data for the execution of the application 1800 may include resource data, a database of the application 1800, or data that is generated in response to the execution of the application 1800.

Afterward, the installation control logic 1720 may decompress the compressed installation file of the application 1800 and may extract the installation file and a resource file of the application 1800. Then, the installation control logic 1720 may store the installation file and the resource file of the application 1800 in the generated logical storage.

The installation control logic 1720 may allocate ID information of the application 1800 in order to correspond to the installed application 1800. Also, in order to correspond to the ID information of the installed application 1800, the installation control logic 1720 may store, in the form of a file or a database, the storage location of the installation file of the application 1800 and the storage location of the application 1800.

The application control logic 1730 may control the execution of the application 1800. Also, the application control logic 1730 may store information related to the execution of the application 1800.

For example, if the application control logic 1730 receives a user input requesting the execution of the application 1800, the application control logic 1730 may obtain the storage location of the installation file of the application 1800 that is stored by the installation control logic 1720. Then, the application control logic 1730 may load the execution file of the application 1800 to a memory, may operate the device 1000 according to an execution code in the loaded execution file, and thus may execute the application 1800.

Since the application 1800 is executed, the controller 1300 may operate the device 1000 by controlling the user input unit 1100, the output unit 1200, the sensor (not shown), the communication unit 1500, and the AN input unit 1600.

The application control logic 1730 may store the ID information of the executed application 1800. Also, in order to correspond to the ID information of the application 1800, the application control logic 1730 may store ID information of an executed module.

If the application control logic 1730 receives a user input of stopping the execution of the application 1800, the application control logic 1730 may stop the execution of the application 1800. The application control logic 1730 may stop execution of all modules that configure the application 1800 or may stop execution of only some preset modules in order to correspond to the application 1800. The application control logic 1730 may store ID information of the application 1800 of which execution is stopped. Also, the application control logic 1730 may store ID information of a module of which execution is stopped and ID information of another module that is constantly executed.

The application control logic 1730 may determine a user's use pattern of the application 1800, based on the information about the execution of the application 1800. The use pattern of the application 1800 may be determined while corresponding to each application 1800. The use pattern of the application 1800 may include an average execution time of the application 1800, an average number of times of executing the application 1800, an execution interval, a time of a day when the application 1800 is mainly executed, or a day of a week when the application 1800 is mainly executed.

The background module control logic 1740 may determine, based on the use pattern of the application 1800, a method of controlling execution of the background module 1900 after the execution of the application 1800 is stopped.

The background module control logic 1740 may obtain a characteristic of the background module 1900. The characteristic of the background module 1900 may include at least one selected from power consumption, a network use, and a CPU use rate.

For example, when the background module 1900 is executed, the background module control logic 1740 may monitor an amount of data that the background module 1900 exchanges with an external device and a CPU use by the background module 1900. The background module control logic 1740 may estimate the power consumption of the background module 1900, based on the network use or the CPU use rate of the background module 1900.

The background module control logic 1740 may determine a first background stop time that corresponds to the background module 1900, based on at least one selected from the power consumption, resource use, and the network use of the background module 1900. For example, when the power consumption of the background module 1900 is great, the background module control logic 1740 may control an execution time period of the background module 1900 to be decreased while the execution of the application 1800 is stopped.

Since a time elapses from when the execution of the application 1800 was stopped, the background module control logic 1740 may control the execution of the background module 1900.

The background module control logic 1740 may determine the first background stop time that is a time period to stop the execution of the background module 1900 so as to correspond to a time period between the point of time when the execution of the application 1800 was stopped and a first point of time.

The background module control logic 1740 may determine the first background stop time in proportion to the time period between the point of time when the execution of the application 1800 was stopped and the first point of time.

The background module control logic 1740 may predetermine the first background stop time before the first point of time. In this case, when it is after the first point of time from when the execution of the application 1800 was stopped, the background module control logic 1740 may obtain a predetermined first background stop time.

The background module control logic 1740 may stop the execution of the background module 1900 during the determined first background stop time.

Since it is after the first point of time from when the execution of the application 1800 was stopped, the background module control logic 1740 may stop the execution of the background module 1900 during the determined first background stop time.

The background module control logic 1740 may stop the execution of the background module 1900 during the first background stop time while a time elapses from the first point of time to a second point time. The background module control logic 1740 may constantly stop the background module 1900 during a background stop time. Alternatively, the background module control logic 1740 may periodically stop the background module 1900 during the background stop time.

For example, the background module control logic 1740 may set that an event will occur if the time period between the point of time when the execution of the application 1800 was stopped and the first point of time has elapsed, when background module control logic 1740 determines that the execution of the application 1800 was stopped.

Since the time period between the point of time when the execution of the application 1800 was stopped and the first point of time has elapsed, the device 1000 may generate a time event so as to notify that it is after the first point of time. When the background module control logic 1740 determines that the time event has occurred, the background module control logic 1740 may determine that it is after the first point of time.

The background module control logic 1740 may have a list of the background modules 1900 that configure the applications 1800, respectively. Also, the background module control logic 1740 may determine not only the execution of the application 1800 but may also determine execution of the background module 1900 of the application 1800, based on the information stored by the application control logic 1730.

Accordingly, when the background module control logic 1740 determines that it is after the first point of time, the background module control logic 1740 may stop the execution of the background module 1900.

Since the background module 1900 is stopped, the background module control logic 1740 may obtain a first background stop time per unit time that corresponds to the time period between the point of time when the execution of the application 1800 was stopped and the first point of time.

Also, the background module control logic 1740 may set that a time event will occur if the first background stop time per unit time has elapsed from when the background module 1900 was stopped, when the background module control logic 1740 determines that the background module 1900 was stopped. When the time event occurs, the background module control logic 1740 may determine that the first background stop time per unit time has elapsed.

If the first background stop time per unit time has elapsed, the device 1000 may re-execute the background module 1900.

Since the first background stop time per unit time has elapsed, the background module control logic 1740 may re-execute the background module 1900 that was stopped.

If the background module control logic 1740 determines that a unit time has elapsed from the first point of time, the background module control logic 1740 may re-stop the background module 1900.

Accordingly, the background module control logic 1740 may stop the execution of the background module 1900 at every unit time between the first point of time and the second point time during the first background stop time per unit time.

The background module control logic 1740 may stop the execution of the background module 1900 at every unit time between the second point of time and a third point of time during a second background stop time per unit time that corresponds to a time period between the point of time when the execution of the application 1800 was stopped and the second point of time.

If an expected deletion time of the application 1800 has elapsed from when execution of the application 1800 was stopped, the installation control logic 1720 may uninstall the application 1800.

The installation control logic 1720 may determine the expected deletion time of the application 1800, based on at least one selected from the use pattern of the application 1800 and the characteristic of the background module 1900.

If the installation control logic 1720 determines that the expected deletion time of the application 1800 has elapsed, the installation control logic 1720 may determine whether the installation file of the application 1800 is stored in the device 1000.

In order to correspond to the ID information of the application 1800, the application control logic 1730 may store, in the storage 1700, whether the installation file of the application 1800 is stored. Alternatively, the installation control logic 1720 may scan a storage location where installation files of the applications 1800 are collectively stored and may determine whether the installation file of the application 1800 is stored therein.

If the installation file of the application 1800 is not stored in the device 1000, the installation control logic 1720 may generate the installation file of the application 1800, based on a storage location at which the application 1800 was installed.

For example, the installation control logic 1720 may obtain the storage location at which the application 1800 was installed. In order to correspond to the ID information of the application 1800, the installation control logic 1720 may store the storage location, in the form of a file or a database, at which the application 1800 was installed. Accordingly, the installation control logic 1720 may obtain a storage location at which necessary files for the installation file of the application 1800 were stored to correspond to the ID information of the application 1800.

The installation control logic 1720 may extract, from the obtained storage location, the execution file of the application 1800, a resource file of the application 1800, an information file about the application 1800, and an information file and an authentication file about an execution authority of the application 1800. Afterward, the installation control logic 1720 may package the extracted files and may re-generate an installation file of the application 1800. For example, the installation control logic 1720 may compress the extracted files into a file by using a predetermined method and may re-generate the installation file.

In this case, the installation control logic 1720 may re-generate the installation file of the application 1800 in such a manner that the installation file may be configured of same files as an original file. Also, the installation control logic 1720 may re-generate the installation file of the application 1800 in such a manner that the installation file may include not only original files that configure the distributed installation file of the application 1800 but may also include data that was generated by executing the application 1800. The data that was generated by executing the application 1800 may include data about a user's use of the application 1800, a file that was generated by executing the application 1800, or the like.

The installation control logic 1720 may store the re-generated installation file of the application 1800 in a preset installation file storage location. Also, in order to correspond to the ID information of the application 1800, the installation control logic 1720 may store the storage location in which the re-generated installation file of the application 1800 is stored.

Also, the installation control logic 1720 may uninstall the application 1800 that was installed in the device 1000. For example, the installation control logic 1720 may uninstall the application 1800 by deleting files and a plurality of pieces of data that are related to the application 1800, except for the re-generated installation file of the application 1800.

The installation control logic 1720 may delete information about the uninstalled application 1800 from a plurality of pieces of information about the applications 1800 that are installed in the device 1000. Also, the installation control logic 1720 may store ID information of the application 1800 that was uninstalled since the application 1800 was not used for a predetermined period.

Before the installation control logic 1720 uninstalls the application 1800 in the device 1000, the installation control logic 1720 may display, on the display unit 1210, a user interface for receiving an input for selecting whether to uninstall the application 1800. The installation control logic 1720 may uninstall the application 1800, based on a user input selecting to uninstall the application 1800.

After the application 1800 is uninstalled, if the installation control logic 1720 receives a user input requesting an execution of the application 1800, the installation control logic 1720 may reinstall the application 1800.

After the application 1800 is uninstalled, the application control logic 1730 may receive a user input of executing the application 1800.

For example, based on the ID information of the application 1800 of which installation file is stored and that was uninstalled since it had not been used for a predetermined period, the application control logic 1730 may display a list of the re-executable applications 1800.

If the application control logic 1730 receives a user input selecting the uninstalled application 1800, the application control logic 1730 may obtain a storage location of an installation file of the selected application 1800 in order to correspond to ID information of the selected application 1800. Then, the application control logic 1730 may control the installation control logic 1720 to reinstall the selected application 1800, based on the obtained storage location.

The application control logic 1730 may obtain a storage location at which the selected application 1800 is reinstalled. Then, the application control logic 1730 may load an execution file of the selected application 1800 to a memory, may operate the device 1000 according to an execution code in the loaded execution file, and thus may execute the application 1800.

The user input unit 1100 may be a unit by which a user inputs data so as to control the device 100. For example, the user input unit 1100 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch, but one or more various embodiments are not limited thereto.

The output unit 1200 may function to output an audio signal, a video signal, or a vibration signal by being controlled by the controller 1300, and may include the display unit 1210, a sound output unit 1220, a vibration motor 1230, or the like.

The display unit 1210 is controlled by the controller 1300 and thus displays information that is processed in the device 1000.

When the display unit 1210 and a touch pad form a mutual layer structure and then are formed as a touch screen, the display unit 1210 may be used as both an output device and input device. The display unit 1210 may include at least one selected from a Liquid Crystal Display (LCD), a Thin Film Transistor-Liquid Crystal Display (TFT-LCD), an Organic Light-Emitting Eiode (OLED) display, a flexible display, a three-dimensional (3D) display, and an electrophoretic display. Also, according to a type of the device 1000, the device 1000 may include at least two display units 1210.

The sound output unit 1220 may output audio data that is received from the communication unit 1500 or is stored in the storage 1700. The sound output unit 1220 may also output a sound signal (e.g., a call signal receiving sound, a message receiving sound, a notifying sound, or the like) related to capabilities performed by the device 1000. The sound output unit 1220 may include a speaker, a buzzer, or the like.

The sensor (not shown) may sense a status of the device 1000 or a status around the device 1000, and may deliver information about the sensed status to the controller 1300. The sensor may include, but is not limited to, a magnetic sensor, an acceleration sensor, a temperature/humidity sensor, an infrared sensor, a gyroscope sensor, a position sensor (e.g., GPS), an air pressure sensor, a proximity sensor, or a Red, Green, and Blue (RGB) sensor (i.e., a luminance sensor). Functions of the sensors may be intuitively deduced by one of ordinary skill in the art by referring to names of the sensors, thus, detailed descriptions thereof are omitted here.

The communication unit 1500 may include one or more elements allowing communication between the device 1000 and an external device (not shown) or communication between the device 1000 and a server (not shown). For example, the communication unit 1500 may include a short-range wireless communication unit 1510, a mobile communication unit 1520, and a broadcast receiving unit 1530.

The short-range wireless communication unit 1510 may include, but is not limited to, a Bluetooth communication unit, a Bluetooth Low Energy (BLE) communication unit, a Near Field Communication (NFC) unit, a Wireless Local Area Network (WLAN), Wireless Fidelity (Wi-Fi) communication unit, a ZigBee communication unit, an Infrared Data Association (IrDA) communication unit, a Wi-Fi Direct (WFD) communication unit, an Ultra WideBand (UWB) communication unit, or an Ant+ communication unit.

The mobile communication unit 1520 exchanges a wireless signal with at least one selected from a base station, an external terminal, and a server on a mobile communication network. The wireless signal may include various types of data according to communication of a sound call signal, a video call signal, or a text/multimedia message.

The broadcast receiving unit 1530 receives a broadcast signal and/or information related to a broadcast from the outside through a broadcast channel. The broadcast channel may include a satellite channel and a ground wave channel. According to an embodiment, the device 1000 may not include the broadcast receiving unit 1530.

The A/V input unit 1600 may receive an input of an audio signal or a video signal and may include a camera 1610 and a microphone 1620. The camera 1610 may obtain an image frame such as a still image or a video via an image sensor during a video call mode or an image-capturing mode. An image that is captured via the image sensor may be processed by the controller 1300 or a separate image processing unit (not shown).

The image frame that is processed by the camera 1610 may be stored in the storage 1700 or may be transmitted to an external source via the communication unit 1500. According to a configuration of the device 1000, two or more cameras 1610 may be arranged.

The microphone 1620 receives an external sound signal as an input and processes the received sound signal into electrical voice data. For example, the microphone 1620 may receive a sound signal from an external device or a speaker. In order to remove noise that occurs while the sound signal is externally input, the microphone 1620 may use various noise removing algorithms.

It should be understood that the various embodiments described therein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a mobile terminal of managing an application having a background module and a foreground module, the method comprising:

after a predetermined time period from when the execution of the foreground module of the application was stopped, stopping the execution of the background module of the application during a first idle period;

after the first idle period, executing the background module of the application during a first execution period;

after the first execution period, stopping the background module during a second idle period;

after the second idle period, executing the background module during a second execution period; and uninstalling the application in the mobile terminal when a predetermined time for uninstalling the application is elapsed from when the execution of the foreground module was stopped, wherein after when the execution of the foreground module of the application was stopped, an average execution period of the background module is gradually decreased, and wherein the predetermined time for uninstalling the application is after when the average execution period of the background module is decreased to 0.

2. The method of claim 1, wherein a duration of the second idle period is longer than a duration of the first idle period.

3. The method of claim 1, wherein the first idle period comprises an idle period per unit time that corresponds to a time period during which the execution of the background module is stopped for a preset interval.

4. The method of claim 3, wherein the stopping of the execution of the background module comprises:

stopping the execution of the background module;

determining whether the idle period per unit time has elapsed from when the execution of the background module was stopped; and if the idle period per unit time has elapsed, executing the background module.

5. The method of claim 1, wherein the first idle period is determined based on at least one of power consumption, resource use, or network use of the background module.

6. The method of claim 1, wherein the stopping of the background module comprises stopping the background module at a plurality of points of time, and wherein the plurality of points of time are determined based on at least one of a number of times of execution, an execution interval, and an execution time period of the application.

7. The method of claim 1, wherein the uninstalling of the application comprises:
  generating an installation file of the application;
  storing the installation file of the application; and
  uninstalling the application,
  wherein the generated installation file of the application includes data that was generated as the application was executed in the mobile terminal.

8. The method of claim 1, wherein the uninstalling of the application further comprises:
  displaying a user interface for receiving an input for selecting whether to uninstall the application; and
  uninstalling the application, based on a user input selecting to uninstall the application.

9. The method of claim 7, further comprising:
  receiving a user input requesting execution of the foreground module of the application;
  upon the receiving of the user input, installing the application; and
  executing the application.

10. A non-transitory computer-readable recording medium having recorded thereon a program for executing in a computer the method of claim 1.

11. A mobile terminal comprising:
  a processor configured to execute one or more applications; and
  a storage configured to store the one or more applications,
  wherein the one or more applications comprise:
    an application having a background module and a foreground module, and
    a management application configured to:
      after a predetermined time period from when the execution of the foreground module of the application was stopped, stop the execution of the background module of the application during a first idle period,
      after the first idle period, execute the background module of the application during a first execution period,
      after the first execution period, stop the background module during a second idle period,
      after the second idle period, execute the background module during a second execution period, and
      uninstall the application in the mobile terminal when a predetermined time for uninstalling the application is elapsed from when the execution of the foreground module was stopped,
  wherein after when the execution of the foreground module of the application was stopped, an average execution period of the background module is gradually decreased, and
  wherein the predetermined time for uninstalling the application is after when the average execution period of the background module is decreased to 0.

12. The mobile terminal of claim 11, wherein a duration of the second idle period is longer than a duration of the first idle period.

13. The mobile terminal of claim 11, wherein the first idle period comprises an idle period per unit time that corresponds to a time period during which the execution of the background module is stopped for a preset interval.

14. The mobile terminal of claim 13, wherein, when the management application stops the execution of the background module, the management application is further configured to:
  stop the execution of the background module,
  determine whether the idle period per unit time has elapsed from when the execution of the background module was stopped, and
  if the idle period per unit time has elapsed, execute the background module.

15. The mobile terminal of claim 11, wherein the first idle period is determined based on at least one of power consumption, resource use, or network use of the background module.

16. The mobile terminal of claim 11,
  wherein the management application is further configured to stop the background module at a plurality of points of time, and
  wherein the plurality of points of time are determined based on at least one of a number of times of execution, an execution interval, and an execution time period of the application.

17. The mobile terminal of claim 11,
  wherein, when the management application uninstalls the application, the management application is further configured to:
    generate an installation file of the application,
    store the installation file of the application, and
    uninstall the application,
  wherein the generated installation file of the application includes data that was generated as the application was executed in the mobile terminal.

18. The mobile terminal of claim 11, wherein, when the management application uninstalls the application, the management application is further configured to:
  display a user interface for receiving an input for selecting whether to uninstall the application; and
  uninstall the application, based on a user input selecting to uninstall the application.

19. The mobile terminal of claim 17, wherein the management application is further configured to:
  receive a user input requesting execution of the foreground module of the application;
  upon the receiving of the user input, install the application; and
  execute the application.

* * * * *